United States Patent [19]

Hashida

[11] Patent Number: 5,584,539
[45] Date of Patent: Dec. 17, 1996

[54] BRAKE FLUID PRESSURE CONTROLLER HAVING A SHUT OFF VALVE FORMING A FLUID RESERVOIR

[75] Inventor: Koichi Hashida, Itami, Japan

[73] Assignee: Sumitomo Electric Industries, Ltd., Osaka, Japan

[21] Appl. No.: 535,480

[22] Filed: Sep. 27, 1995

[30] Foreign Application Priority Data

Oct. 12, 1994 [JP] Japan .................. 6-246400

[51] Int. Cl.$^6$ .................. B60T 8/48; B60T 8/42
[52] U.S. Cl. .................. 303/113.2; 303/84.2; 303/116.2
[58] Field of Search .................. 303/113.2, 116.1, 303/116.2, 113.1, 84.2

[56] References Cited

U.S. PATENT DOCUMENTS

| | | | |
|---|---|---|---|
| 5,195,809 | 3/1993 | Burgdorf | 303/113.2 |
| 5,290,098 | 3/1994 | Burgdorf et al. | 303/113.2 |

FOREIGN PATENT DOCUMENTS

| | | |
|---|---|---|
| 64-74153 | 3/1989 | Japan . |
| 4-231241 | 8/1992 | Japan . |
| 5-116607 | 5/1993 | Japan . |
| 5-193473 | 8/1993 | Japan . |
| 6-72301 | 3/1994 | Japan . |
| 9324351 | 12/1993 | WIPO .................. 303/113.2 |

*Primary Examiner*—Matthew C. Graham
*Attorney, Agent, or Firm*—Wenderoth, Lind & Ponack

[57] ABSTRACT

A compact, cost-effective, high-performance, highly reliable brake fluid controller functioning both as a antilock controller and a traction controller. This controller is basically a fluid-return type antilock brake controller with a relief valve and a shutoff valve further added thereto. The shutoff valve has a fluid chamber and an atmospheric-pressure chamber that are defined by a piston. A valve body movable together with the piston closes and opens fluid communication between a discharged fluid reservoir and a fluid supply line. During traction control mode, fluid is supplied to the pump from the fluid chamber. With this arrangement, it is possible to omit an intermediate reservoir which was necessary in a conventional controller of this type. It is also possible to reduce the resistance to the suction force of the pump to a minimum.

4 Claims, 2 Drawing Sheets

1

BRAKE FLUID PRESSURE CONTROLLER HAVING A SHUT OFF VALVE FORMING A FLUID RESERVOIR

BACKGROUND OF THE INVENTION

The present invention relates to a high-performance, simple-in-structure brake fluid pressure controller functioning both as an antilock controller and a traction controller.

The most cost-effective and thus most popular antilock controller type is known as a dump & pump type. This type of antilock controller has a brake fluid pressure control valve including a discharge valve and provided in a main fluid line leading from the master cylinder to the wheel brakes. While the brake pressure is being reduced in an antilock control mode, brake fluid discharged from the discharge valve is stored temporarily in a discharged fluid reservoir, and returned to the main fluid line with a pump when the brake pressure is re-increased.

If the pump for returning fluid into the main fluid line is used also to increase the brake pressure for traction control, it is possible to use this antilock controller as a traction controller as well. A controller of this type is disclosed in Unexamined Japanese Patent Publication 64-74153. It is basically a fluid-return type antilock controller with an on-off valve further added thereto. During traction control mode, the fluid supply line is connected to the main fluid line through the on-off valve, while they are disconnected from each other while no traction control is being performed. But with this arrangement, fluid has to be supplied from the master cylinder reservoir through a pipeline during traction control, so that the pump cannot draw and discharge brake fluid at a sufficiently high rate. Thus, the response was not high enough.

On the other hand, Unexamined Japanese Patent Publication 6-72301 proposes to provide a second reservoir in addition to the discharged fluid reservoir in order to supply fluid smoothly to the pump. But in this arrangement, when the pump is activated while the fluid pressure produced in the master cylinder (hereinafter referred to as master cylinder pressure) is zero, the piston in the second reservoir will move, making it impossible to supply fluid for traction control. Also, every time the brakes are applied, a piston for suppressing the activation of the second reservoir when the master cylinder pressure is produced moves in and out. This extends the brake pedal stroke. Due to these problems, this controller is practically useless.

Unexamined Japanese Patent Publication 4-231241 proposes to use an active pressure accumulator having a driving device as the abovementioned second reservoir. This accumulator operates in a desirable manner, and can supply fluid to the pump more efficiently than the reservoir without a driving device. But a considerable increase in cost due to the provision of the driving device and its driving circuit is unavoidable.

In order to solve these problems, the applicant of the present invention proposed an improved brake fluid pressure controller in Unexamined Japanese Patent Publication 5-116607.

This controller has a wheel brake fluid pressure control valve including at least a discharge valve and provided in a main fluid line leading from a master cylinder to a wheel brake, a discharged fluid reservoir for temporarily storing brake fluid discharged from the discharge valve, a pump for drawing brake fluid stored in this discharged fluid reservoir and returning it to the main fluid line at a fluid return point, a fluid supply line branching from the main fluid line at a point upstream from the fluid return point and leading to the discharged fluid reservoir, a changeover valve for preventing the flow of fluid from the fluid return point to the master cylinder during traction control mode, and a shutoff valve for preventing the flow of fluid from the fluid supply line toward the discharged fluid reservoir while the master cylinder is being pressurized, and is characterized in that an intermediate fluid reservoir is provided upstream of the shutoff valve near the master cylinder so that it communicates with the fluid supply line at least during traction control.

Unexamined Japanese Patent Publication 5-193473 also discloses a similar controller provided with an intermediate fluid reservoir in the main fluid line.

The controller we proposed in Unexamined Japanese Patent Publication 5-116607 has advantages in that fluid can be supplied smoothly into the pump by the provision of the intermediate fluid reservoir, and that the intermediate reservoir is prevented from remaining empty because it is connected with the main fluid line.

But this controller has problems in that the shutoff valve disposed between the intermediate fluid reservoir and the pump produces a force that resists the suction force of the pump, and that the provision of the shutoff valve and the intermediate reservoir complicate the structure of the entire controller. It is further necessary to provide a piston in the intermediate chamber to define an atmospheric-pressure chamber and a fluid chamber therein. The provision of the piston necessitates some measures to prevent the piston from getting locked due to rusting or icing.

An object of the present invention is to provide a high-performance, cost-effective, reliable, compact fluid-return type brake fluid pressure controller having both the functions of an antilock controller and a traction controller.

SUMMARY OF THE INVENTION

According to the present invention, there is provided a brake fluid pressure controller including a wheel brake fluid pressure control valve including at least a discharge valve and provided in a main fluid line leading from a master cylinder to a wheel brake. A discharged fluid reservoir is provided for temporarily storing brake fluid discharged from the discharge valve. A pump is provided for drawing the brake fluid stored in the discharged fluid reservoir and returning it to the main fluid line at a fluid return point. A fluid supply line branches from the main fluid line at a point upstream of the fluid return point and leads to the discharged fluid reservoir. A changeover valve is provided for checking the flow of fluid from the fluid return point to the master cylinder during traction control and a relief valve is provided for directing any excess fluid charged from the pump toward the fluid return point during traction control to the main fluid line at a point upstream of the changeover valve. Also, a shutoff valve is provided for checking the flow of fluid from the fluid supply line toward the discharged fluid reservoir while the master cylinder is being pressurized. The shutoff valve has an atmospheric-pressure chamber, a fluid chamber leading to the discharged fluid reservoir, a piston separating the fluid chamber from the atmospheric-pressure chamber, and a valve body movable with the piston for shutting off the fluid supply line from the discharged fluid reservoir when the piston is at the end of its stroke near the atmospheric-pressure chamber and for opening fluid communication between the fluid supply line and the discharged fluid reservoir when the piston is at a position other than the end. The fluid chamber undergoes a change in volume of an amount substantially equal to the amount of brake fluid supplied to the wheel brake during the traction control mode when the piston makes a full stroke from the end near the said atmospheric chamber to the other end.

The shutoff valve may have a biasing means for biasing the piston toward the atmospheric-pressure chamber with a force small enough to allow the piston to move toward the fluid chamber under a negative pressure produced by the pump. In this arrangement, it is preferable to provide a throttle means in the fluid supply line for restricting the flow of fluid through the fluid supply line, and to connect the outlet port of the relief valve to the fluid supply line at a point between the throttle means and the shutoff valve.

According to the present invention, since the shutoff valve acts as an intermediate reservoir, there is no need to provide a separate intermediate reservoir. Thus, the entire controller can be made smaller and manufactured at low cost.

Also, since there is no need to provide valve means or anything between the fluid chamber as a fluid supply chamber and the pump, the resistance to the drawing force of the pump is limited to a minimum. The shutoff valve opens when the master cylinder pressure is produced, and closes when the fluid chamber becomes full of brake fluid. Thus, the fluid chamber never becomes empty during traction control. Preventive measures against rusting and icing are needed only at one point, i.e. only for the piston defining the atmospheric-pressure chamber and the fluid chamber.

The biasing means pushes the piston back to its original position (the end of its stroke near the atmospheric-pressure chamber) as soon as the pump is deactivated. Thus, it is possible to increase the wheel brake pressure during normal braking as effectively as any conventional braking system.

The provision of the biasing means makes it necessary to increase the intensity of negative pressure on the fluid drawing side when the pump is activated in order to move the piston against the force of the biasing means. The higher the negative pressure, the larger the amount of brake fluid drawn into the pump from the master cylinder. This may hamper the operation of the master cylinder at the end of traction control. But by providing the throttling means, it restricts the flow of brake fluid from the master cylinder toward the pump. Instead, excess brake fluid charged from the pump, which flows into the fluid supply circuit through the relief valve, is preferentially introduced into the shutoff valve.

Other features and objects of the present invention will become apparent from the following description made with reference to the accompanying drawings, in which:

DETAILED DESCRIPTION OF THE PREFERRED EMBODIMENT

Figure 1:
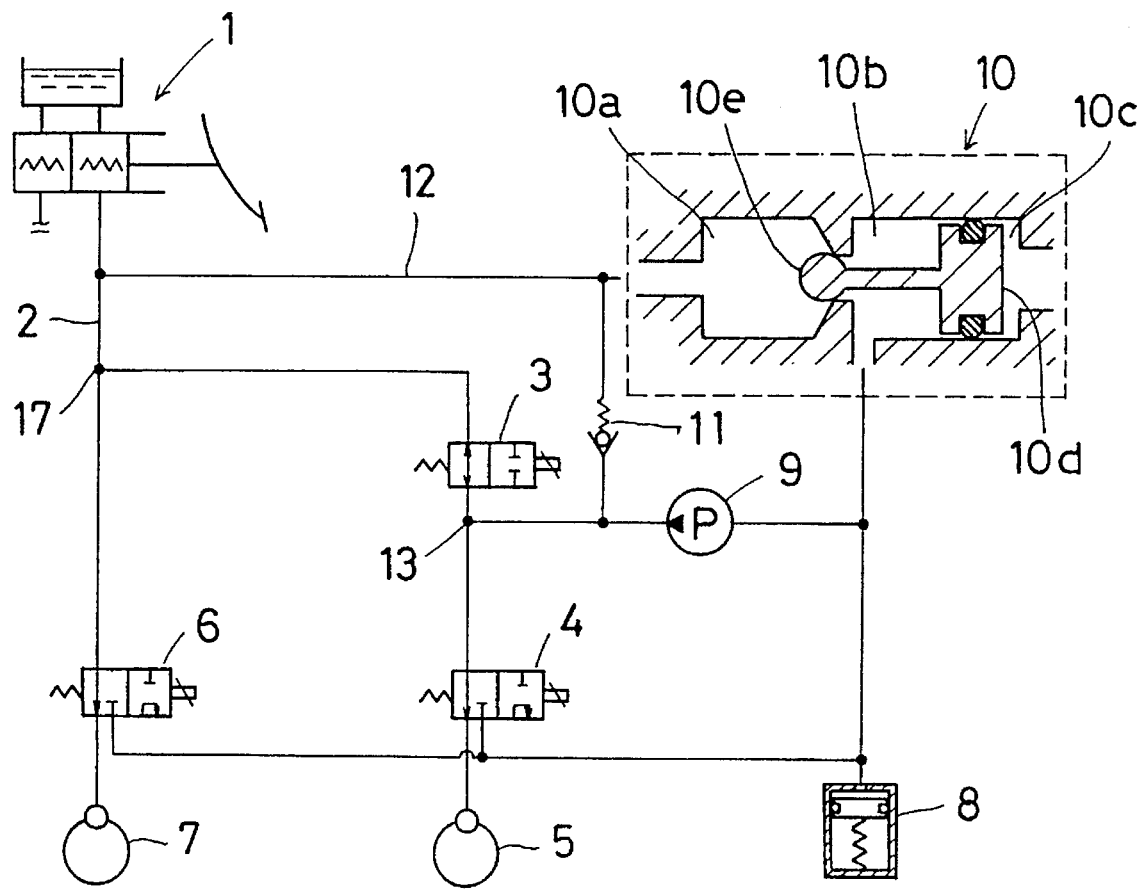
FIG. 1 is a circuit diagram of a first embodiment.

FIG. 1 shows a first embodiment of the brake fluid pressure controller according to the present invention. The brake circuit shown in FIG. 1 comprises a master cylinder 1; a main fluid line 2 leading to wheel brakes; a changeover valve 3; a control valve 4 for a driven wheel brake; the driven wheel brake 5; a control valve 6 for an undriven wheel brake; the undriven wheel brake 7; a discharged fluid reservoir 8 used in a dump & pump type antilock device; a pump 9; a shutoff valve 10; a relief valve 11; and a fluid supply line 12 that branches from the main fluid line at a point upstream from a fluid return point 13 at which fluid discharged from the pump 9 is returned to the main fluid line.

The shutoff valve 10 has a valve chest 10a communicating with the fluid supply line 12, a fluid chamber 10b communicating with the valve chest 10a, an atmospheric-pressure chamber 10c, a piston 10d liquid-tightly separating the fluid chamber 10b and the atmospheric-pressure chamber 10c from each other, and a valve body 10e integral with the piston 10d. It is designed such that when the piston 10d moves from near the atmospheric-pressure chamber 10c toward the valve chest 10a, the fluid chamber 10b is subjected to a reduction in its volume that is at least equal to the amount of brake fluid supplied to the wheel brakes during traction control.

The changeover valve 3 remains open during the normal braking and antilock braking modes. When the pump 9 is activated in these modes, a negative pressure will be produced in the fluid chamber 10b, so that the piston 10d will be moved a short distance. But as soon as the piston 10d moves a little, the valve body 10e separates from the valve seat, so that the piston cannot move any further. In the arrangement shown, the master cylinder pressure is applied to the shutoff valve 10 in the valve closing direction. Thus, the piston 10d cannot move from its original position shown at all, so that the valve 10 remains closed. Namely, the valve 10 remains inoperative during these modes, so that the controller can perform braking control during the normal and antilock braking modes in exactly the same way as any known conventional antilock controller. Also, even if the piston 10d has been moved toward the valve chest 10a from its original position when the brakes are applied, the piston will return to its original position, thus closing the valve 10, as soon as the master cylinder pressure is produced.

When the traction control begins, the changeover valve 3 is closed and the pump 9 is activated. Suppose the master cylinder pressure at this time is zero. The piston 10d is thus moved leftwardly in FIG. 1 under the negative pressure produced by the pump 9, so that the fluid in the fluid chamber 10b is supplied smoothly into the pump 9. The fluid supplied to the pump 9 will never flow toward the master cylinder because the changeover valve 3 is closed. Thus, the fluid from the pump flows through the driven wheel brake control valve 4 to the driven wheel brake 5, increasing the fluid pressure in the driven wheel brake 5, so that the driven wheel will be prevented form spinning.

Once the driven wheel stops spinning, the driven wheel brake control valve 4 controls the fluid pressure in the driven wheel brake 5 to reduce to a level at which the driven wheel will not begin spinning again. Even after the brake pressure has been reduced, the pump 9 keeps charging fluid at the same rate, producing excess fluid. Such excess fluid is discharged through the relief valve 11 into the supply line 12, and then drawn into the pump 9 through the shutoff valve 10.

In the arrangement of FIG. 1, when the pump 9 is activated while the master cylinder pressure is zero, the piston 10d is moved leftwardly in the figure. On the other hand, as mentioned earlier, when the master cylinder begins to produce pressure, the piston 10d is moved back to its original position if it is not in the original position when the brake pedal is depressed, or remains in the original position if it is in the original position. Thus, the driver will have different pedal feelings when he depresses the brake pedal depending upon whether the piston is in its original position or not.

Figure 2:
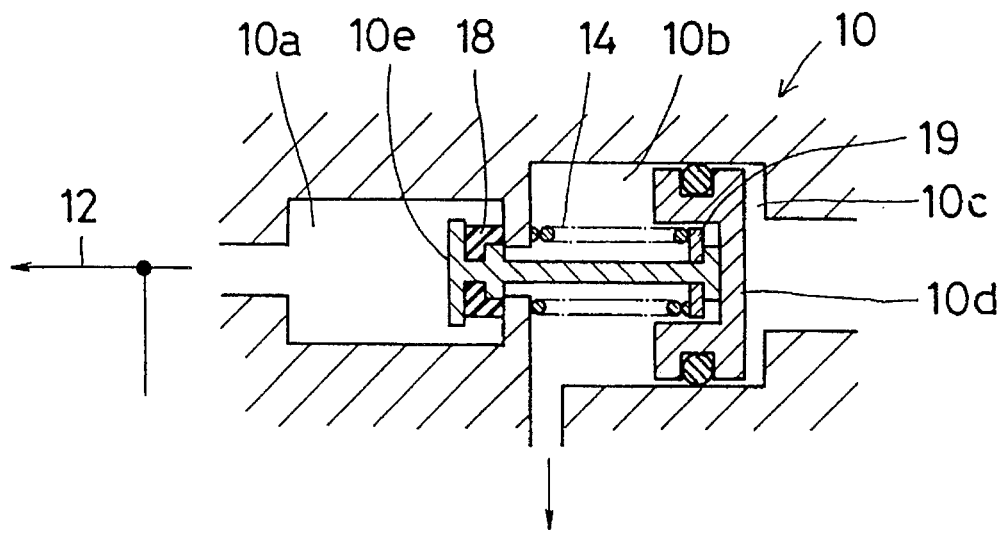
FIG. 2 is a sectional view of a shutoff valve of a second embodiment.

FIG. 2 shows an arrangement for eliminating such difference in pedal feelings (second embodiment). In this embodiment, the piston 10d is biased toward the atmospheric-pressure chamber 10c by a spring 14 having a spring force small enough to allow the piston to move toward the valve chest 10a under the negative pressure produced by the pump 9. With this arrangement, the piston 10d is always kept in its original position when the brake pedal is depressed, so that the driver can always get unchanged pedal feelings.

But the addition of the spring 14 may pose a different problem. Namely, the pump 9 has to produce a sufficiently high negative pressure to allow the piston to move overcoming the force of the spring 14. Due to such high negative pressure, the pump 9 tends to gradually draw fluid from the master cylinder 1 during traction control. During an ordinary traction control mode, the driven wheel brake pressure reduces gradually to near zero as the spinning tendency of the wheel subsides. In this case, any fluid that has been drawn from the master cylinder can gradually flow back into the master cylinder through the shutoff valve 10.

But if the brake pedal is depressed during traction control with the brake fluid being discharged, the changeover valve 3 will be opened with the driven wheel brake 5 being pressurized. This may hamper the operation of the master cylinder.

Figure 3:
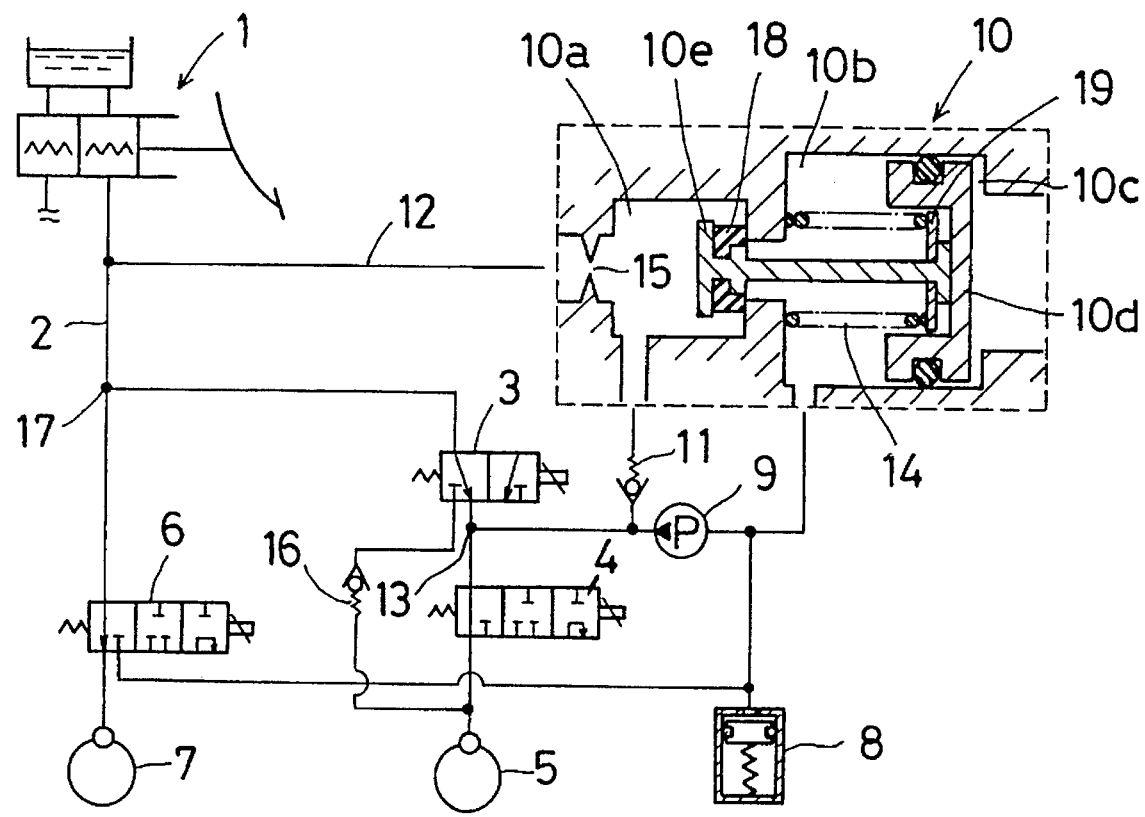
FIG. 3 is a circuit diagram of a third embodiment.

FIG. 3 shows the brake fluid pressure controller of the third embodiment, which offers a solution to the above problem.

In the figure, numeral 15 indicates a throttle provided in the fluid supply line 12. The throttle 15 produces flow resistance, thereby restricting the flow of brake fluid therethrough and thus the amount of brake fluid drawn into the pump 9 from the master cylinder during traction control. In this embodiment, the outlet side of the relief valve 11 is preferably connected to the supply line 12 at a point nearer the shutoff valve 10 than the throttle 15. This is because, with this arrangement, excess fluid discharged from the pump and returned through the relief valve 11 flows preferentially into the fluid chamber 10b, so that brake fluid can be smoothly supplied to the pump, making it possible for the pump to smoothly and continuously discharge fluid.

Further, the changeover valve 3 of the third embodiment has, besides the function of shutting off the main fluid line 2 during traction control, the function of connecting the master cylinder 1 to a bypass circuit with a check valve 16 if the brake pedal is depressed during traction control so that the brake pressure can be increased quickly in such a situation. In the embodiment, the point 17 at which the main fluid line 2 branches to the lines leading to the undriven wheel brakes 7 and driven wheel brakes 5 is located upstream of the changeover valve 3 (at the master cylinder side). But this branch point may be provided downstream of the changeover valve 3 so that the undriven wheel brake pressure can be kept low during traction control by controlling the undriven wheel brake control valve 6.

In FIGS. 2 and 3, numeral 18 indicates a valve seal, and 19 indicates a spring presser.

What is claimed is:

1. A brake fluid pressure controller comprising:

a wheel brake fluid pressure control valve including at least a discharge valve and provided in a main fluid line leading from a master cylinder to a wheel brake;

a discharged fluid reservoir for temporarily storing brake fluid discharged from said discharge valve;

a pump for drawing the brake fluid stored in said discharged fluid reservoir and returning it to the main fluid line at a fluid return point;

a fluid supply line branching from the main fluid line at a point upstream of said fluid return point and leading to said discharged fluid reservoir;

a changeover valve for checking the flow of fluid from said fluid return point to the master cylinder during traction control;

a relief valve for directing any excess fluid from the pump toward said fluid return point during traction control to the main fluid line at a point upstream of said changeover valve; and a shutoff valve for checking the flow of fluid from said fluid supply line toward said discharged fluid reservoir while the master cylinder is being pressurized, characterized in that:

said shutoff valve has an atmospheric-pressure chamber, a fluid chamber communicating with said discharged fluid reservoir, a piston separating said fluid chamber from said atmospheric-pressure chamber, a valve body movable with said piston for shutting off said fluid supply line from said discharged fluid reservoir when said piston is at a first end of its stroke near said atmospheric-pressure chamber and for opening fluid communication between said fluid supply line and said discharged fluid reservoir when said piston is at a position other than said first stroke end, and that:

said fluid chamber undergoes a change in volume of an amount substantially equal to the amount of brake fluid supplied to the wheel brake during traction control mode when said piston makes a full stroke from said first end near said atmospheric chamber to a second end.

2. A brake fluid pressure controller as claimed in claim 1 further comprising a biasing means for biasing said piston toward said atmospheric-pressure chamber with a force small enough to allow said piston to move toward said fluid chamber under a negative pressure produced by said pump.

3. A brake fluid pressure controller as claimed in claim 2 further comprising a throttle means provided in said fluid supply line for restricting the flow of fluid through the fluid supply line, said relief valve having an outlet port connected to said fluid supply line at a point between said throttle means and said shutoff valve.

4. A brake fluid pressure controller as claimed in claim 1 further comprising a throttle means provided in said fluid supply line for restricting the flow of fluid through the fluid supply line, said relief valve having an outlet port connected to said fluid supply line at a point between said throttle means and said shutoff valve.

* * * * *